US011906426B2

(12) United States Patent
Dabkowski (10) Patent No.: US 11,906,426 B2
(45) Date of Patent: Feb. 20, 2024

(54) SUSPENDED SOLIDS MEASUREMENT OF WASTEWATER

(71) Applicant: HACH COMPANY, Loveland, CO (US)

(72) Inventor: Robert Francis Dabkowski, Laporte, CO (US)

(73) Assignee: HACH COMPANY, Loveland, CO (US)

( * ) Notice: Subject to any disclaimer, the term of this patent is extended or adjusted under 35 U.S.C. 154(b) by 637 days.

(21) Appl. No.: 17/058,618

(22) PCT Filed: Jun. 27, 2019

(86) PCT No.: PCT/US2019/039497
§ 371 (c)(1),
(2) Date: Nov. 24, 2020

(87) PCT Pub. No.: WO2020/006227
PCT Pub. Date: Jan. 2, 2020

(65) Prior Publication Data
US 2021/0208067 A1     Jul. 8, 2021

Related U.S. Application Data

(60) Provisional application No. 62/692,322, filed on Jun. 29, 2018.

(51) Int. Cl.
*G01N 21/53* (2006.01)
*C02F 1/52* (2023.01)

(52) U.S. Cl.
CPC ......... *G01N 21/532* (2013.01); *C02F 1/5209* (2013.01); *C02F 2209/10* (2013.01)

(58) Field of Classification Search
CPC ........... G01N 21/31; G01N 2201/1293; G01N 21/3504; G01N 21/4738;
(Continued)

(56) References Cited

U.S. PATENT DOCUMENTS 3,617,757 A * 11/1971 Burr .................. G01N 21/53
250/575
3,713,743 A * 1/1973 Simms ................ G01N 21/532
356/442
(Continued)

FOREIGN PATENT DOCUMENTS

CA     2995159 C  *  7/2020  ........... G01N 21/253
CN   101681172 A  *  3/2010  ............. G05D 21/02
(Continued)

OTHER PUBLICATIONS

International Searching Authority Notification of Transmittal of the International Search Report and the Written Opinion of the International Searching Authority, or the Declaration, dated Jan. 8, 2020, pp. 15.

(Continued)

*Primary Examiner* — Michael P Stafira
(74) *Attorney, Agent, or Firm* — Ference & Associates LLC (57) ABSTRACT

The invention provides a method and a system for measuring suspended solids in wastewater, including: introducing an aqueous sample into a measurement system, comprising at least one length of tubing; pumping, using a pump, the aqueous sample through the at least one length of tubing; and measuring, using at least one optical sensor, a quantity of suspended solids in the aqueous sample wherein at least one optical sensor is coupled to the length of tubing in a position to measure the quantity of suspended solids while the aqueous sample is located in the at least one length of tubing.

20 Claims, 3 Drawing Sheets

(58) Field of Classification Search
CPC ......... G01N 2021/3595; G01N 21/031; G01N 2001/205; G01N 21/09; G01N 27/4163; G01N 27/4165; G01N 35/00693; G01N 35/1004; G01N 21/85; G01N 21/94; G01N 33/573; G01N 21/3563; G01N 2201/0636; G01N 1/146482; G01N 2021/6484; G01N 21/25; G01N 21/35; G01N 21/8806; G01N 2201/12; G01N 2201/129; G01N 33/02; G01N 11/02; G01N 11/08; G01N 11/1037; G01N 2021/3137; G01N 21/274; G01N 2201/0833; G01N 29/36; G01N 30/34; G01N 1/20; G01N 1/405; G01N 2001/1043; G01N 2001/2071; G01N 2011/0026; G01N 2011/0066; G01N 2021/6419; G01N 2021/6421; G01N 2021/6471; G01N 2021/8416; G01N 21/03; G01N 21/15; G01N 21/314; G01N 21/359; G01N 21/78; G01N 21/84; G01N 27/49; G01N 33/182; G01N 33/346; G01N 33/5038; G01N 33/92; G01N 35/00732; G01N 21/9508; G01N 21/05; G01N 1/2035; G01N 21/53; G01N 33/1893; G01N 33/1886; G01N 2001/2064; G01N 21/645; G01N 33/18; G01N 21/45; G01N 27/38; G01N 35/00623; G01N 35/1097; G01N 21/59; G01N 2500/02; G01N 33/1866; G01N 2201/061; G01N 1/14; G01N 2001/1427; G01N 2021/6482; G01N 2021/8466; G01N 21/0303; G01N 21/3577; G01N 21/534; G01N 2201/128; G01N 35/021; G01N 1/00; G01N 2001/1025; G01N 2001/1037; G01N 2021/3166; G01N 21/27; G01N 21/6486; G01N 21/8507; G01N 2201/0826; G01N 2333/916; G01N 2500/04; G01N 33/26; G01N 33/54373; G01N 1/4077; G01N 11/04; G01N 2001/4088; G01N 2021/151; G01N 2021/6432; G01N 2035/1025; G01N 21/253; G01N 21/3103; G01N 21/532; G01N 21/6428; G01N 27/4161; G01N 27/4166; G01N 30/468; G01N 33/1806; G01N 33/1813; G01N 33/1826; G01N 33/343; G01N 33/53; G01N 33/84; G01N 35/08; G01N 35/1009; C02F 1/66; C02F 1/4672; C02F 1/001; C02F 1/32; C02F 1/78; C02F 2209/006; C02F 1/722; C02F 2209/40; C02F 2209/22; C02F 3/34; C02F 2209/005; C02F 2209/0208; C02F 2209/44; C02F 2209/36; C02F 1/40; C02F 2209/001; C02F 1/00; C02F 1/28; C02F 1/50; C02F 1/5209; C02F 2101/36; C02F 2103/064611; C02F 2209/03; C02F 1/281; C02F 1/286; C02F 1/685; C02F 1/008; C02F 1/76; C02F 2209/003; C02F 2209/008; C02F 2303/04; C02F 1/283; C02F 9/00; C02F 2101/30; C02F 1/5236; C02F 2101/20; C02F 2209/02; C02F 2209/06; C02F 2209/08; C02F 2305/023; C02F 3/12; C02F 1/36; C02F 2101/32; C02F 2103/32; C02F 2201/4618; C02F 2209/11; C02F 3/006; C02F 1/285; C02F 1/46104; C02F 1/72; C02F 2101/16; C02F 2103/06; C02F 2103/10; C02F 2201/4611; C02F 2209/42; C02F 2301/024; C02F 1/34; C02F 1/444; C02F 1/52; C02F 2001/46142; C02F 2001/46147; C02F 2101/10; C02F 2101/101; C02F 2103/001; C02F 2103/30; C02F 2103/365; C02F 2201/004; C02F 2201/005; C02F 2209/04; C02F 2209/10; C02F 2209/24; C02F 2301/022; C02F 2301/043; C02F 2307/00; C02F 2307/08; C02F 1/20; C02F 1/441; C02F 1/4608; C02F 1/46109; C02F 1/48; C02F 1/5245; C02F 2101/105; C02F 2103/002; C02F 2103/005; C02F 2103/023; C02F 2103/325; C02F 2103/327; C02F 2103/44; C02F 2201/46115; C02F 2201/46135; C02F 2201/4614; C02F 2301/08; C02F 3/30; C02F 3/348; C02F 1/24; C02F 1/461; C02F 1/46176; C02F 1/682; C02F 1/686; C02F 1/725; C02F 1/727; C02F 11/143; C02F 2001/46133; C02F 2001/46161; C02F 2001/46166; C02F 2001/5218; C02F 2101/106; C02F 2101/14; C02F 2101/18; C02F 2101/325; C02F 2101/40; C02F 2103/18; C02F 2103/20; C02F 2201/009; C02F 2201/46195; C02F 2201/784; C02F 2209/23; C02F 2209/26; C02F 2209/29; C02F 2301/026; C02F 2303/02; C02F 2303/08; C02F 2303/14; C02F 2303/16; C02F 2303/20; C02F 2305/04; C02F 3/00; C02F 3/06; C02F 3/10; C02F 3/101; C02F 3/28; C02F 3/327; C02F 3/341; C02F 1/06; C02F 1/325; C02F 1/42; C02F 1/44; C02F 1/4678; C02F 1/5281; C02F 1/56; C02F 11/12; C02F 11/147; C02F 2001/425; C02F 2001/46138; C02F 2001/46171; C02F 2003/001; C02F 2101/163; C02F 2101/38; C02F 2103/008; C02F 2103/16; C02F 2103/26; C02F 2103/28; C02F 2103/343; C02F 2201/002; C02F 2201/3223; C02F 2201/326; C02F 2201/4615; C02F 2201/46165; C02F 2203/004; C02F 2301/02; C02F 2301/063; C02F 2303/24; C02F 3/105; C02F 3/1284; C02F 3/201; C02F 3/2806; C02F 3/2853; C02F 3/2866; C02F 3/301; C02F 3/307; C02F 3/308; C02F 3/325

See application file for complete search history.

(56) References Cited

U.S. PATENT DOCUMENTS

| | | | |
|---|---|---|---|
| 4,672,216 A * | 6/1987 | Pitt | G01N 21/53 250/575 |
| 10,859,481 B2 * | 12/2020 | van Oort | E21B 21/01 |
| 2003/0146310 A1 * | 8/2003 | Jackson | A62D 3/20 239/690 |
| 2010/0122913 A1 | 5/2010 | Matousek et al. | |
| 2015/0160125 A1 * | 6/2015 | Jackson | G01N 21/59 250/227.23 |
| 2016/0054281 A1 * | 2/2016 | Smeeton | G01N 21/3103 250/373 |

(56) References Cited

U.S. PATENT DOCUMENTS

| | | | | |
|---|---|---|---|---|
| 2016/0096756 A1* | 4/2016 | Wright | ................. | C02F 11/121 |
| | | | | 210/702 |
| 2016/0123882 A1* | 5/2016 | Gilmore | ................ | G01N 21/85 |
| | | | | 250/227.11 |
| 2020/0102233 A1* | 4/2020 | White | ...................... | C02F 9/00 |

FOREIGN PATENT DOCUMENTS

| | | | | |
|---|---|---|---|---|
| CN | 103038147 A * | 4/2013 | .......... | B01F 3/04503 |
| DE | 3025521 A1 | 1/1982 | | |
| DE | 102005036364 A1 * | 2/2007 | ......... | B01D 21/2488 |
| DE | 102005036364 A1 | 2/2007 | | |
| GB | 2490537 A * | 11/2012 | ............. | G01J 3/427 |
| KR | 200448858 Y1 * | 5/2010 | | |
| WO | WO-2017115476 A1 * | 7/2017 | ............. | B01D 61/02 |

OTHER PUBLICATIONS

J. Wilhelm-Shalganov, Search Results Under Rule 164(2)(b) EPC of EP Application No. 19748619, dated Nov. 24, 2021, 2 pages, The Hague.

\* cited by examiner

SUSPENDED SOLIDS MEASUREMENT OF WASTEWATER

FIELD

This application relates generally to suspended solids measurement of an aqueous sample, and, more particularly, to suspended solids measurement using optical methods during the dewatering process.

BACKGROUND

Ensuring water quality is critical to the health and well-being of humans, animals, and plants, which are reliant on water for survival. One parameter of water that may be measured during the dewatering phase is the amount of suspended solids in the water. The measurement of suspended solids of wastewater is critical to the process of wastewater treatment. Measurement of suspended solids may allow for proper treatment of sludge or ensuring proper water quality for sensitive purposes, and allows for identifying the overall efficacy of the dewatering of the sludge. One current technique to measure suspended solids in wastewater samples requires human interaction to obtain samples from the wastewater treatment facility.

BRIEF SUMMARY

In summary, one embodiment provides a method for measuring suspended solids in wastewater, comprising: introducing an aqueous sample into a measurement system, comprising at least one length of tubing; pumping, using a pump, the aqueous sample through the at least one length of tubing; and measuring, using at least one optical sensor, a quantity of suspended solids in the aqueous sample, wherein at least one optical sensor is coupled to the length of tubing in a position to measure the quantity of suspended solids while the aqueous sample is located in the at least one length of tubing.

Another embodiment provides a system for measuring suspended solids in wastewater, comprising: at least one optical sensor; at least one length of tubing; at least one pump; a memory device that stores instructions executable by the processor to: introduce an aqueous sample into a measurement device comprising at least one length of tubing, pump, using the at least one pump, the aqueous sample through the at least one length of tubing; and measure, using the at least one optical sensor, a quantity of suspended solids in the aqueous sample, wherein the at least one optical sensor is coupled to the length of tubing in a position to measure the quantity of suspended solids while the aqueous sample is located in the at least one length of tubing.

A further embodiment provides a product for measuring suspended solids in wastewater, comprising: a storage device having code stored therewith, the code being executable by the processor and comprising: code that introduces an aqueous sample into a measurement device comprising at least one length of tubing, code that pumps, using at least one pump, the aqueous sample through the at least one length of tubing; and code that measures, using at least one optical sensor, a quantity of suspended solids in the aqueous sample, wherein at least one optical sensor is coupled to the length of tubing in a position to measure the quantity of suspended solids while the aqueous sample is located in the at least one length of tubing.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

The cost of hauling away or disposing of waste may be very high. Water laden waste may be inefficient to haul away or move, and may cost the treatment facility in fuel or transport costs. Therefore, the treatment of wastewater often includes a step of dewatering to reduce the amount of water in the product. Dewatering takes a sludge water mixture and extracts water from the mixture. The sludge is a mixture of water and solid waste which may be 2-3% solid. It may be possible to apply a polymer to that mixture which causes the solids to combine to create larger solid pieces. A proper amount of polymer may be used to produce proper caking of solids. In other words, a polymer may be added such that the solids stick together. The mixture containing the polymer may then be put into a centrifuge that spins water out of the sludge. Time in the centrifuge may produce a product that is 20-25% solid and 75-80% water, thereby, having significantly less water than the initial sludge material.

Solids coming out of the centrifuge in the water coming from the centrifuge represent solids not captured by the centrifuge. This water coming from the centrifuge is referred to as centrate. Thus, typically, there are two outputs coming from the centrifuge: cake and centrate. Ideally, the centrate coming from the centrifuge should have very little suspended solids. Measuring the solid content in the centrate or water from the centrifuge may be critical to proper wastewater treatment. Conventionally, to measure suspended solids requires an operator to observe the solids in the water. Therefore, humans may walk through the processing center observing the cake dropping into a bin or taking a sample of the water. The sample may undergo a visual inspection by the operator. This method relies upon an operator to pass through the area which may be hazardous or foul smelling. Additionally, often times the operator is making rounds and observing many centrifuges on a single shift. Further analysis requires the operator to collect a sample and deliver the sample to a lab, which take many hours or days to process the sample.

Efficiently and effectively operating the centrifuge to result a product having optimized water content (e.g., a water content that is balanced with the cost of operating the centrifuge and/or the cost of polymer) may be difficult. The difficulty arises because there is no good way to measure the water that comes out of the centrifuge. In other words, there is no easy way to determine how much suspended solid may be present in water that comes out of a centrifugation process. What is needed is a method, system, and product can sample water coming from the centrifuge and measure suspended solid concentration automatically, in real time. Additionally, a measure of suspended solids in the water from the centrifuge may help identify a proper polymer dose.

Accordingly, the methods and systems described herein provide a technique to measure suspended solids in an aqueous sample, for example, a volume of wastewater. The wastewater may be the product of a dewatering process from a centrifuge step in wastewater treatment. In an embodiment, an aqueous sample may be introduced to a measurement system. The aqueous sample may be pumped or forced under pressure through the measurement system. For example, the aqueous sample may be pumped through the system using a pump, for example, a progressive cavity pump, screw pump, gear pump, etc. A progressive cavity pump may provide the most efficient transportation of the fluid through measurement system since it will not get plugged by debris or other large objects within the aqueous sample. The aqueous sample may pass through a series of pipes such that the suspended solids remain in suspension. For example, there may be a series of vertical lengths of tubing through which the aqueous sample passes. The tubing may be in any configuration to maintain the suspension of solids in the tubing.

An embodiment may include one or more sensors used to measure the suspended solids in the aqueous sample, for example, the one or more sensors may be located on a WYE or TEE connector or fitting positioned in the tubing. The one or more sensors may be optical sensors capable of measuring the suspended solid in the aqueous sample. The one or more sensors may be operatively coupled to a measurement device, system controls, output devices, or the like.

In an embodiment, a defoaming agent may be introduced to the aqueous sample as the aqueous sample is introduced into the measurement system to produce a less foamy aqueous sample that is more conducive to optical measurement. The defoaming agent may be pumped into the aqueous sample using a diaphragm pump or the like. In an embodiment, the system may have a pressure valve to release gas pressure from the measuring system. In an embodiment, the system may further comprise a system that can communicate with a polymer dispensing system of the centrifuge and may provide feedback to the polymer dispensing system to adjust the amount of polymer that is added to the centrifuge. The feedback may be based upon the measurement that identifies the amount of suspended solids in the aqueous sample. Additionally, the measurement system may include a wash cycle to cleanse the system.

The illustrated example embodiments will be best understood by reference to the figures. The following description is intended only by way of example, and simply illustrates certain example embodiments.

Figure 1:
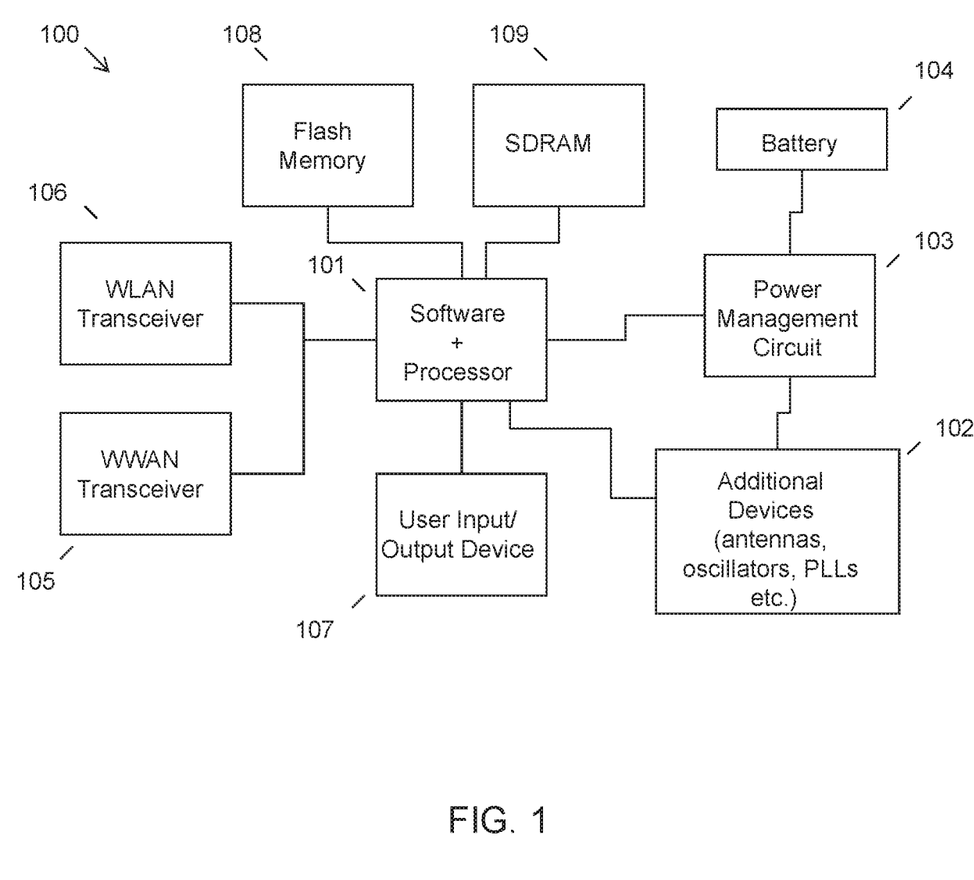
FIG. 1 illustrates an example of computer circuitry

While various other circuits, circuitry or components may be utilized in information handling devices, with regard to an instrument for suspended solids measurement according to any one of the various embodiments described herein, an example is illustrated in FIG. 1. Device circuitry 100 may include a measurement system on a chip design found, for example, a particular computing platform (e.g., mobile computing, desktop computing, etc.) Software and processor(s) are combined in a single chip 101. Processors comprise internal arithmetic units, registers, cache memory, busses, I/O ports, etc., as is well known in the art. Internal busses and the like depend on different vendors, but essentially all the peripheral devices (102) may attach to a single chip 101. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 103, e.g., a battery management unit, BMU, which manage power as supplied, for example, via a rechargeable battery 104, which may be recharged by a connection to a power source (not shown). In at least one design, a single chip, such as 101, is used to supply BIOS like functionality and DRAM memory.

System 100 typically includes one or more of a WWAN transceiver 105 and a WLAN transceiver 106 for connecting to various networks, such as telecommunications networks and wireless Internet devices, e.g., access points. Additionally, devices 102 are commonly included, e.g., a transmit and receive antenna, oscillators, PLLs, etc. System 100 includes input/output devices 107 for data input and display/rendering (e.g., a computing location located away from the single beam system that is easily accessible by a user). System 100 also typically includes various memory devices, for example flash memory 108 and SDRAM 109.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment to perform suspended solids measurement of an aqueous sample.

Figure 2:
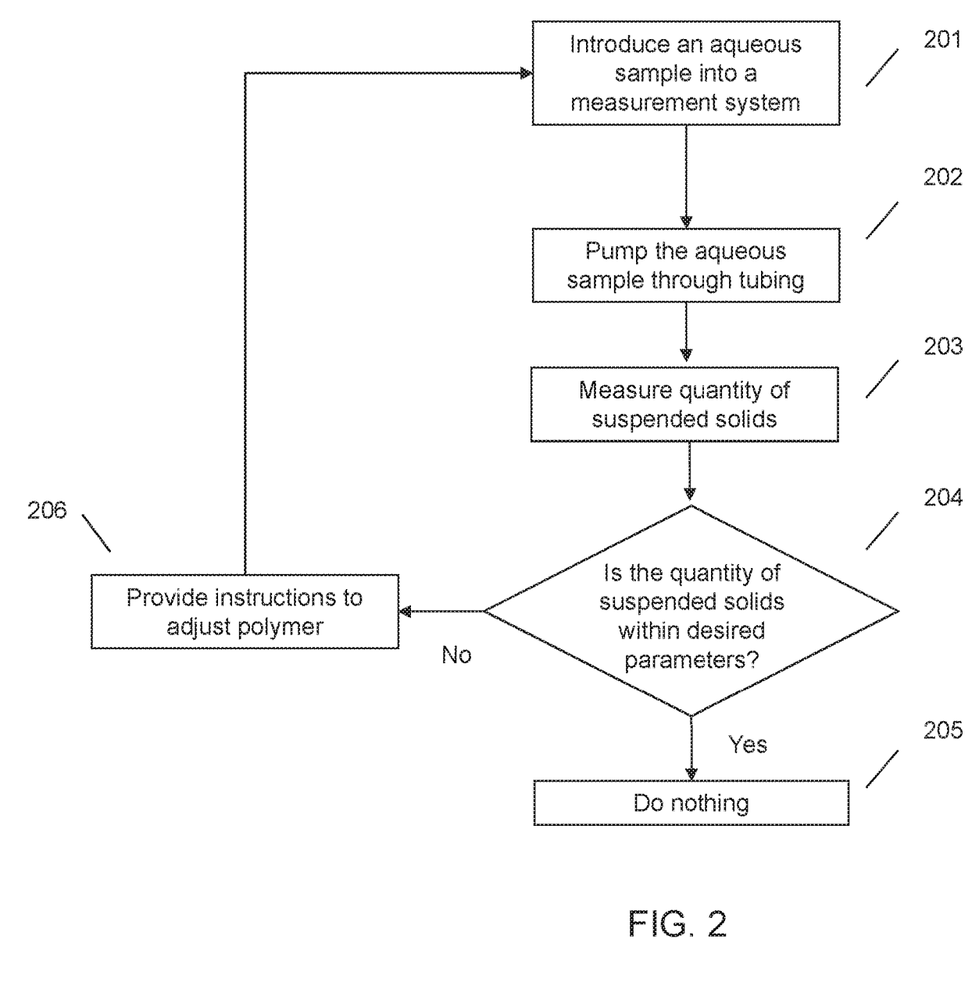
FIG. 2 illustrates a flow diagram of measuring suspended solids in an aqueous sample.

Referring now to FIG. 2, an embodiment may measure suspended solids in an aqueous solution. In an embodiment, the aqueous solution may be the effluent for a centrifuge in the dewatering process of a wastewater treatment facility. For example, as water is removed from a mixed solution of solids and water that was introduced into a centrifugal apparatus, the removed water comes out of as effluent from the centrifuge. This effluent water from the centrifuge may still contain solids in suspension. In an embodiment, the systems and methods described herein may measure the amount or quantity of the solids present in this effluent water after the dewatering process.

Figure 3:
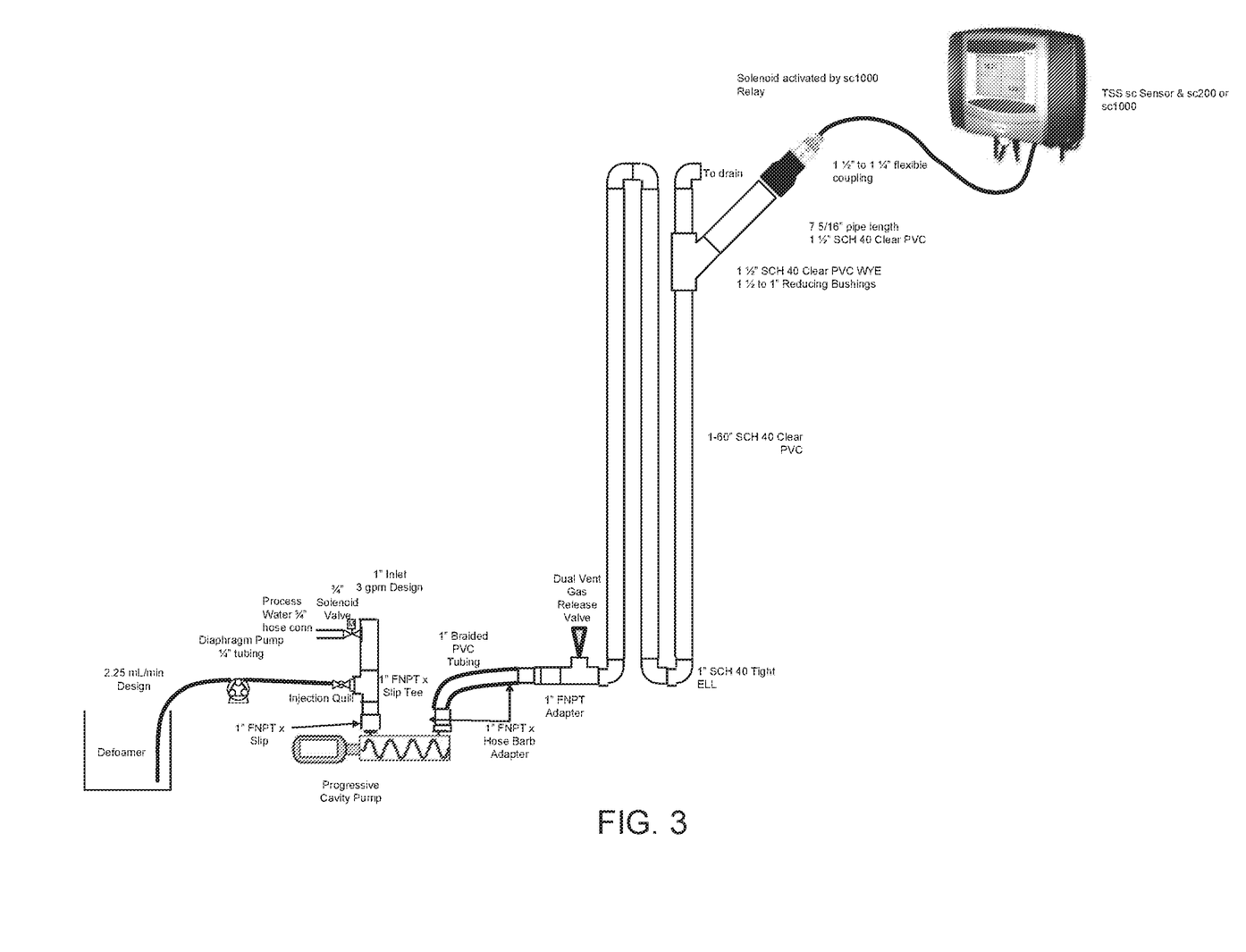
FIG. 3 illustrates a schematic diagram of a measurement system for measuring suspended solids in an aqueous sample in an example embodiment.

At 201, in an embodiment, the aqueous sample may be introduced into the measurement system, for example, as illustrated in FIG. 3. In an embodiment, the aqueous sample may be drawn from an effluent flow from the dewatering centrifuge. The inlet from the centrifuge to the measurement device may be 1 inch in diameter. The aqueous sample may be under pressure as it enters the measuring system. Alternatively, the aqueous sample may be contained in a holding vessel or the like and pumped into the measurement system. The aqueous sample may enter or be introduced to the measurement system at a controlled flow rate. The controlled flow rate may be a flow rate that is identified in order to maintain the solids in suspension while in the measurement system. For example, the flow may be 3 gallons per minute (gpm). The flow rate may be controlled via the pump rate of the pump, the diameter of the tubing or piping, the length of the tubing or piping, and the like.

An embodiment may include valves, solenoids, flow control mechanisms, or the like, to control the influx of the aqueous sample. The aqueous sample may be placed or introduced to the measurement system manually by a user or using a mechanical means, for example, gravity flow, a pump, pressure, fluid flow, or the like. For example, a water sample for suspended solids testing may be introduced to a measurement system or test chamber using a pump. For example, a pump may "pull" the aqueous sample from a holding tank, the inlet from the centrifugal pump, or the like. This pump is described in more detail below.

In an embodiment, the system may inject a defoaming agent into the aqueous sample. Effluent from the centrifugal pump of the dewatering process may be foamy. For example, a portion of the volume of the aqueous sample may have a foamy or bubbly appearance and consistency. The foamy portion of the aqueous sample may interfere with the measurement of suspended solids. Additionally, the foamy portion of the aqueous sample may interfere with the proper pumping of the aqueous sample through the measurement device. Also, the foamy portion of the aqueous sample may interfere with the proper maintenance of the suspended solids in the aqueous sample. Therefore, the defoaming agent may be injected into the aqueous sample to reduce the bubbles and foamy appearance of the aqueous sample.

The defoaming agent, for example, a commercial off-the-shelf defoming agent, may be injected at a controlled rate, for example, 2.25 mL/min. However, this rate may be changed based upon the amount of foam in the aqueous sample, the fluid rate of the aqueous sample, the amount of suspended solids, or the like. The controlled rate may be altered through user input or by an automated system. The defoamer injection may be performed using a defoamer injection quill. Additionally, the defoaming portion may include a pump, for example, a diaphragm pump, to transport the defoamer to the injection quill. For example, the defoaming agent may be transported through tubing or piping, for example, ¼ inch tubing, using the pump to the injection quill. The defoamer injection quill may be located between the inlet from the dewatering centrifuge and the pump used to pump the aqueous sample through the measurement system.

At 202, in an embodiment, the system may pump the aqueous sample through one or more lengths of tubing. In an embodiment, the pump may be a progressive cavity pump, diaphragm pump, screw pump, or the like. A progressive cavity pump may provide the most efficient transportation of the fluid through measurement system since it will not get plugged by debris or other large objects within the aqueous sample. In other words, the pump may be a pump type that allows proper pumping of the aqueous sample even if the aqueous sample contains solid material. The pump may include a mechanism such as an auger to pump an aqueous sample and suspended solids. The pump may be operatively connected to a control system, which may start the pump, stop the pump, adjust the speed of the pump, reverse the pump flow, or the like. The pump may also have associated control systems that detect suboptimal pumping, blockage, damage, or the like.

The aqueous sample and the defoamer mixture may be drawn through the pump and may be pushed into a subsequent portion of the measurement system. The subsequent portion of the measurement system may include a gas release mechanism. The gas release mechanism may be a valve, mechanical release, pressure relief valve, or other mechanism, that allows gas to be released from the aqueous sample mixture without releasing the solid and/or liquid portion of the mixture. The gas release mechanism may be used to release the pressure that may be built up through the use of the defoamer. The gas release mechanism may be automatic, for example, when the pressure builds up the release mechanism may automatically open, or may be controlled with a control system that opens the pressure release mechanism at predetermined intervals (e.g., every five minutes, every time a sample is drawn from the centrifuge, etc.). This gas release mechanism may be located before one or more lengths of tubing or piping.

The influx of the aqueous sample into the tubing or piping may be controlled with a valve, for example, a solenoid valve, that opens as closes as samples are introduced into the tubing or piping. In an embodiment, an aqueous sample may pass through one or more lengths of tube or pipe. The physical configuration of the one or more lengths of tubing may vary. For example, the one or more lengths of tubing may be three vertical lengths of tubing with bends at the ends to allow continuous flow of an aqueous sample to pass through all three vertical lengths, for example, as shown in FIG. 3. Alternatively, the one or more lengths of tubing may be positioned horizontally or any position between vertical and horizontal. The straight sections may be at different angles or positions with respect to other straight lengths of tubing.

The length of the tubes or pipes, number of tubes or pipes, or configuration of the tubes or pipes, may be based upon different parameters. The tubing or piping provides a means for the aqueous sample to be properly prepared for suspended solids measurement. In an embodiment, the proper preparation of the aqueous sample may keep the solids evenly or near evenly suspended in the aqueous sample. Additionally, the tubing and piping provides a time interval for the defoamer to work on the aqueous solution. In other words, the configuration of the tubing and piping may be selected to keep the solids suspended in the aqueous solution and also to allow enough time for the defoamer to work before a measurement is taken. In an embodiment, the one or more lengths of tubing may be 1 inch schedule 40 polyvinylchloride (PVC) piping. The tubing or piping may be visually clear, which may allow an operator to determine if any blockages or other obstructions are present within the measurement system. The one or more lengths of tubing may be of a uniform cross section throughout the run of the one or more lengths of tubing. Alternatively, the cross section may change throughout the run of the one or more lengths of tubing.

In an embodiment, the one or more lengths of tubing may have one or more WYE or TEE fittings. The WYE or TEE fitting may be placed in a straight run of the one or more lengths of tubing, and a sensor may be positioned in the WYE or TEE fitting. The WYE or TEE fitting may allow a flow of aqueous sample to flow past the sensor, where the sensor is used to take a measurement of the suspended solids. After the sample is introduced to the measurement system, the system may measure the suspended solids of the sample, using steps as explained in more detail below. In an embodiment, the measurement device may include one or more chambers and one or more lengths of tubing in which the one or more method steps may be performed.

In an embodiment, the system may have a cleaning cycle. For example, wash water may be run through the apparatus in either a flow or a counterflow direction. The wash cycle may use wash water which may contain no or very little suspended solids. The wash water may be of a different source than the aqueous sample. The wash cycle fluid may be controlled by a solenoid, valves, or the like. For example, the aqueous sample containing suspended solids may be turned off and the wash cycle turned on to wash or flush the apparatus. The amount of time that the wash cycle is run and the intervals that the wash cycle is performed may be user configurable. For example, the user may choose to run the wash cycle after every five sample measurements, every ten minutes, or the like.

At 203, the system may measure a characteristic of an aqueous sample using a sensor placed in a position of the measurement system that allows for measurement of the characteristic. The one or more sensors may measure suspended solids continually, intermittently, or in any manner as specified by the system or user. The characteristic may be a measure of the quantity of suspended solids in the aqueous sample. The sensor may be an optical sensor capable of measuring suspended solids in an aqueous sample. The sensor may be an optical TSS probe use for analysis of suspended solids in the aqueous sample. The sensor may be a HACH® TSS W sc sensor to measure suspended solids in real time. The sensor may be connected to a HACH® sc1000 probe module, which may be networked to sc1000 controllers and/or displayed separately with a sc1000 display. HACH is a registered trademark of Hach Company Corporation in the United States and other countries.

If the sensor successfully performs a measurement of suspended solids of the aqueous sample, the system may output the quantity of suspended solids of the aqueous sample. An output may be in the form of a display, storing the data to a memory device, sending the output through a connected or wireless system, printing the output, or the like. The system may be automated, meaning the system may automatically output the identified quantity of suspended solids. The system may also have associated alarms, limits, or predetermined thresholds. For example, if a measured quantity of suspended solids reaches a threshold, the system may trigger an alarm, adjust the injection of a polymer, alter the flow of the aqueous sample, or the like. Data may be analyzed in real-time, stored for later use, or any combination thereof.

In an embodiment, after the aqueous sample passes the sensor, the aqueous sample may be discharged or drained to an appropriate vessel. The vessel may be part of the wastewater treatment facility that provides for further treatment before release to an outside environment. The aqueous sample may be discharged through a 1 inch discharge hose. The discharge hose flow may be controlled by a solenoid, valve, or the like.

In an embodiment, the one or more sensors may be operatively coupled to a measurement device. The measurement system may include or be operatively coupled to one or more additional components, for example, pumps, valves, solenoids, alarms, injection systems for defoamer and/or polymer, or the like. Additionally, one or more NEMA 4X enclosures may be used as containment for the pump drive, circuit breakers and electrical connections, along with an emergency stop button on the front.

At 204, the system compare measured quantities of suspended solids to a set of parameters. In an embodiment, a set of predetermined parameters for levels of suspended solids may be programmed into the system. For example, if the amount of suspended solids in the aqueous sample falls outside of the parameters, then the system may alter the flow of the aqueous sample, alter injection of defoamer, alter injection of a polymer within the centrifugal pump, or the like. Additionally or alternatively, the system may trigger an alarm, shut down, alter flow control of the aqueous sample, or the like.

At 205, if the quantity of suspended solids in the aqueous sample is within parameters, the system may do nothing. In other words, if the quantity of suspended solids are within a set of parameters, then the dewatering process is performing in a proper manner, and no action may be needed in the sludge treatment process.

On the other hand, at 206, the system may take corrective action if the quantity of suspended solids in the aqueous sample is outside the parameters. In other words, if the quantity of the suspended solids in the aqueous sample is too high or low, this may indicate that the dewatering process of the centrifuge step is not performing properly or efficiently. In other words, the system may detect a level of suspended solids in the aqueous sample indicating that the centrifugal dewatering has not removed enough of the suspended solids from the aqueous sample.

One form of corrective action may include providing instructions to the polymer injection system of the centrifuge to increase or decrease the amount of polymer that is injected into the dewatering device. In an embodiment, one method to increase the efficiency of removing suspended solids from wastewater is to add a polymer. A polymer may increase the ability of suspended solids to cake and be removed through the centrifugal separation. The addition of the polymer may be in the centrifuge itself or at a point upstream of the centrifuge. Thus, the measurement system may provide close to real-time feedback to the centrifugal system in order to optimize the amount of polymer added during centrifugation to provide an effective and efficient dewatering process. In an embodiment, the system may continually measure the quantity of suspended solids in the aqueous sample from the effluent of the centrifugal device and adjust an amount of polymer to efficiently dewater the wastewater.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a hand held measurement device such as illustrated in FIG. 1, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for measuring suspended solids in wastewater, comprising:
    introducing an aqueous sample into a measurement system, comprising at least one length of tubing;
    pumping, using a pump, the aqueous sample through the at least one length of tubing;
    measuring, using at least one optical sensor, a quantity of suspended solids in the aqueous sample, wherein at least one optical sensor is coupled to the length of tubing in a position to measure the quantity of suspended solids while the aqueous sample is located in the at least one length of tubing; and
    injecting, using another pump, a defoamer into the aqueous sample before the pumping, wherein an amount of the defoamer is based upon the measuring.

2. The method of claim 1, wherein the pump comprises a progressive cavity pump.

3. The method of claim 1, wherein the aqueous sample is effluent from a centrifuge of a dewatering process for wastewater treatment.

4. The method of claim 3, further comprising providing instructions to a polymer dispensing system coupled to the centrifuge to adjust an amount of polymer dispensed within the centrifuge based upon the measuring.

5. The method of claim 1, wherein the at least one length of tubing comprises three lengths of vertical tubing connected by couplers allowing for alternating directions of flow of the aqueous sample within the lengths of tubing.

6. The method of claim 1, further comprising injecting the defoamer into the aqueous sample at a location between a dewatering centrifuge and the at least one length of tubing.

7. The method of claim 1, wherein the measurement system comprises a pressure valve that releases gas pressure within the measurement system.

8. The method of claim 1, wherein the measurement system comprises at least one fitting selected from the group consisting of: a WYE fitting and a TEE fitting, positioned in the at least one length of tubing and wherein the optical sensor is located at the at least one fitting.

9. The method of claim 1, further comprising controlling, using a solenoid, a flow of the aqueous sample within the measurement system.

10. The method of claim 1, further comprising providing instructions to introduce wash water into the measurement system.

11. A system for measuring suspended solids in wastewater, comprising:
    at least one optical sensor;
    at least one length of tubing;
    at least one pump;
    a memory device that stores instructions executable by the processor to:
    introduce an aqueous sample into a measurement device comprising at least one length of tubing,
    pump, using the at least one pump, the aqueous sample through the at least one length of tubing;
    measure, using the at least one optical sensor, a quantity of suspended solids in the aqueous sample, wherein the at least one optical sensor is coupled to the length of tubing in a position to measure the quantity of suspended solids while the aqueous sample is located in the at least one length of tubing; and
    inject, using another pump, a defoamer into the aqueous sample before the pumping, wherein an amount of the defoamer is based upon the measuring.

12. The system of claim 11, wherein the pump comprises a progressive cavity pump.

13. The system of claim 11, wherein the aqueous sample is effluent from a centrifuge of a dewatering process for wastewater treatment.

14. The system of claim 13, further comprising providing instructions to a polymer dispensing system coupled to the centrifuge to adjust an amount of polymer dispensed within the centrifuge based upon the measuring.

15. The system of claim 11, wherein the at least one length of tubing comprises three lengths of vertical tubing connected by couplers allowing for alternating directions of flow of the aqueous sample within the lengths of tubing.

16. The system of claim 11, further comprising injecting the defoamer into the aqueous sample at a location between a dewatering centrifuge and the at least one length of tubing.

17. The system of claim 11, wherein the measurement system comprises a gas pressure valve that releases pressure within the measurement system.

18. The system of claim 11, wherein the measurement system comprises at least one fitting selected from the group consisting of: a WYE fitting and a TEE fitting, positioned in the at least one length of tubing and wherein the optical sensor is located at the at least one fitting.

19. The system of claim 11, further comprising controlling, using a solenoid, a flow of the aqueous sample within the measurement system.

20. A product for measuring suspended solids in wastewater, comprising:
a storage device having code stored therewith, the code being executable by the processor and comprising:
code that introduces an aqueous sample into a measurement device comprising at least one length of tubing,
code that pumps, using at least one pump, the aqueous sample through the at least one length of tubing;
code that measures, using at least one optical sensor, a quantity of suspended solids in the aqueous sample, wherein at least one optical sensor is coupled to the length of tubing in a position to measure the quantity of suspended solids while the aqueous sample is located in the at least one length of tubing; and
code that injects, using another pump, a defoamer into the aqueous sample before the pumping, wherein an amount of the defoamer is based upon the measuring.

* * * * *